Oct. 22, 1935.  G. F. HANDLEY  2,017,964
TYPEWRITING MACHINE
Filed May 2, 1935  2 Sheets-Sheet 1
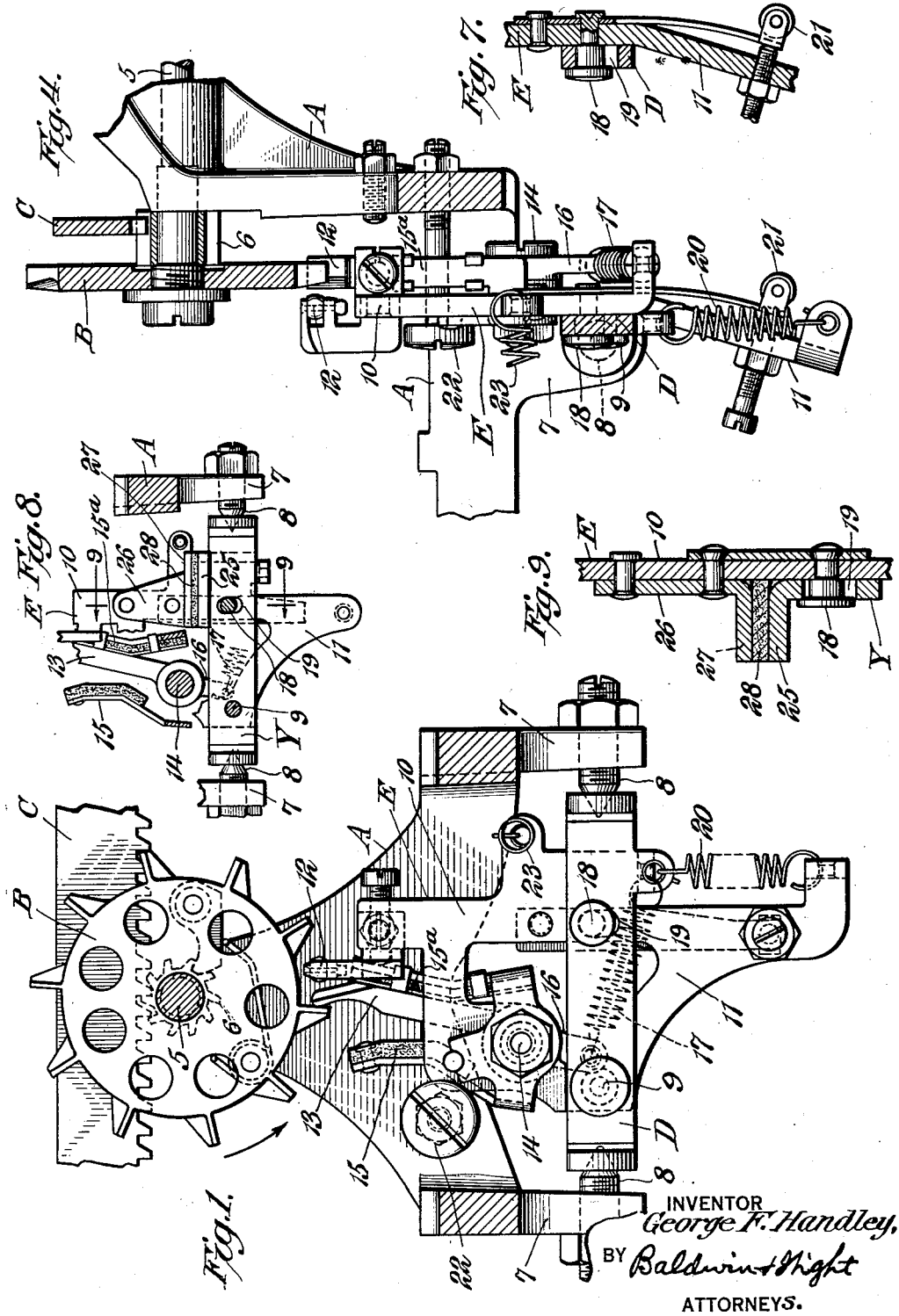

Oct. 22, 1935.        G. F. HANDLEY          2,017,964
                    TYPEWRITING MACHINE
                   Filed May 2, 1935        2 Sheets-Sheet 2
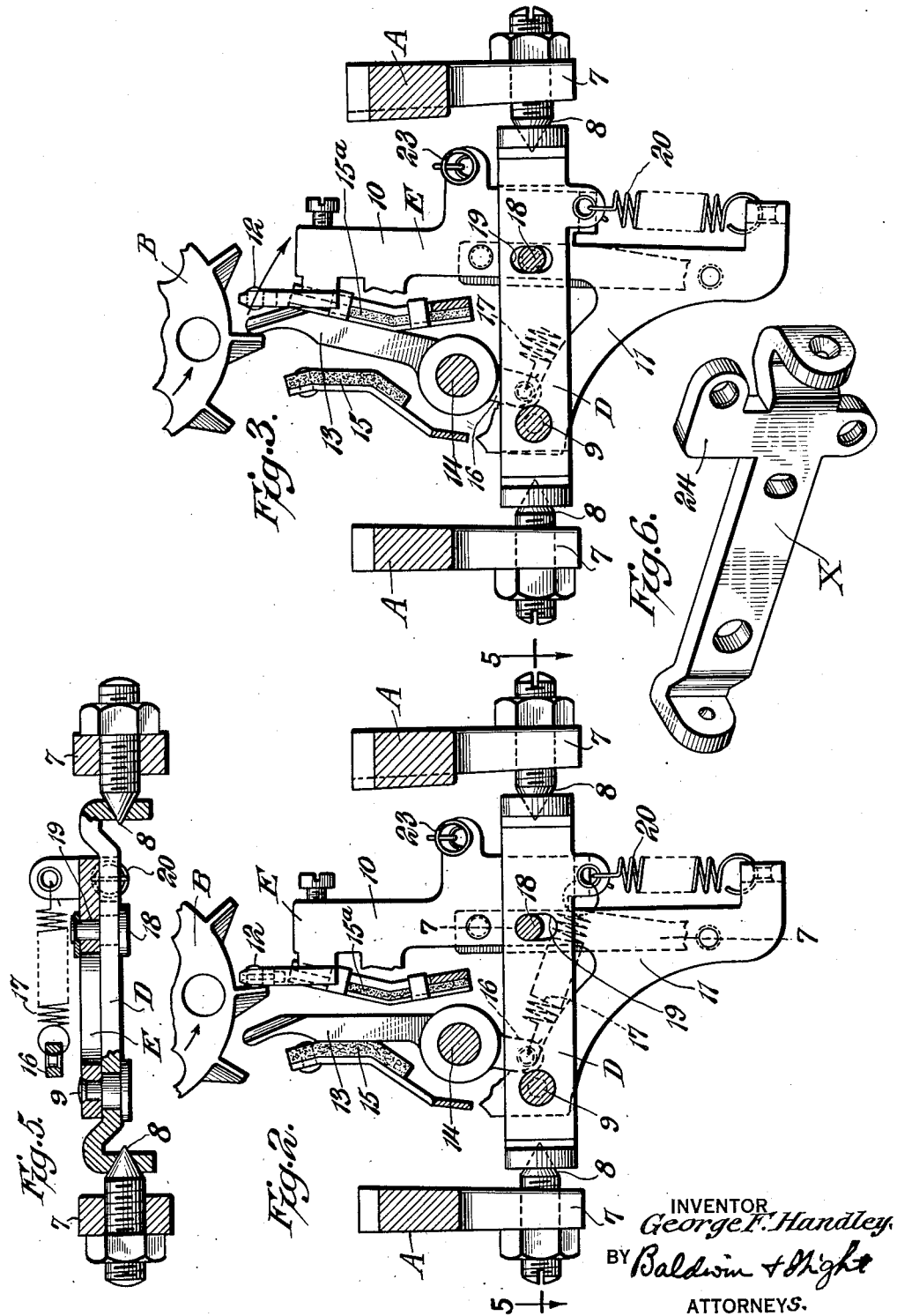
INVENTOR
George F. Handley
BY Baldwin & Wight
ATTORNEYS.

Patented Oct. 22, 1935

2,017,964

UNITED STATES PATENT OFFICE 2,017,964

TYPEWRITING MACHINE

George F. Handley, Glendale, N. Y., assignor to Royal Typewriter Company, Inc., New York, N. Y., a corporation of New York Application May 2, 1935, Serial No. 19,482

4 Claims. (Cl. 197—88)

This invention relates to new and useful improvements in an escapement mechanism for typewriting machines and has for its principal object to provide such a mechanism wherein the usual noise incident to the impact of the movable dog against the stop will be reduced to a minimum.

In the drawings:—

Figure 1 is a front elevation of a carriage escapement mechanism constructed in accordance with my invention, parts thereof being shown in section to better disclose the invention, the view showing the pivoted dog in its normal or holding position, Figure 2 is a similar view but somewhat more in detail showing the fixed dog in position ready to slide off the tooth of the escapement wheel, Figure 3 is a view similar to Figure 2 but showing the positions of the parts at the time of impact by the pivoted dog against the fixed dog and with the tooth of the escapement wheel in engagement with the pivoted dog.

Figure 4 is a vertical sectional view of the mechanism shown in Figure 1, certain of the parts being shown in elevation, Figure 5 is a horizontal sectional view taken on the line 5—5 of Figure 2, Figure 6 is a perspective view showing a modified form of trunnion, Figure 7 is a detail sectional view taken on the line 7—7 of Figure 2, Figure 8 is a detail front elevation showing a modified form of my invention, and Figure 9 is a detail sectional view taken on the line 9—9 of Figure 8.

Referring to the accompanying drawings A designates the usual frame for supporting an escapement wheel B at its upper end, said wheel being fixed to a shaft 5 journaled in said frame and having a pinion 6 thereon and engageable with the usual rack bar C. The frame A is provided with depending arms 7, 7 in which the mounted cone bearings 8, 8 for pivotally supporting a trunnion D whereby the latter is swingable about a horizontal axis located below the escapement wheel B and arranged in a plane at right angles to the longitudinal axis of said wheel. A dog-rocker E is pivotally mounted on the trunnion D by means of a pivot pin 9 which is located at one side of a vertical plane containing the longitudinal axis of the escapement wheel B. Thus the dog rocker E is capable of rocking movements about axes disposed in planes at right angles to each other. The dog rocker E includes a portion 10 which projects above the trunnion D and a portion 11 which depends below said trunnion.

A fixed dog 12 is mounted on the upper portion 10 of the dog rocker E. A movable dog 13 is pivotally mounted as at 14 at its lower end on the upper portion 10 of the dog rocker E and is adapted to oscillate between cushion stops 15, 15ᵃ and the fixed dog 12. The movable dog 13 is provided with an arm 16 which projects below the pivot 14, and a coil spring 17 has one end connected to the arm 16 and the other end to the dog rocker E whereby the movable dog 13 is normally urged in a direction toward the stop 15.

The rocking movement of the dog rocker E about the pivot 9 is limited by means of a stop pin 18 which is fixed to said dog rocker and projects through a vertically extending elongated opening 19 formed in the trunnion D. A coil spring 20, which is slightly stronger than the carriage return spring motor, has its upper end connected to the trunnion D and its lower end connected to the depending portion 11 of said dog rocker and functions to yieldably retain said dog rocker against swinging movement in one direction, the spring also functioning to yieldably retain the stop pin 18 at the upper end of the opening 19. It will therefore be seen that if pressure is exerted against the upper portion 10 of the dog rocker E in a direction toward the right as viewed in Figures 1, 2 and 3, said dog rocker will be swung about its pivot 9 against the tension of said coil spring 20, and upon release of said pressure the spring 20 will immediately return the dog rocker to its normal position as shown in Figure 1.

Attached to the rear face of the depending portion 11 of the dog rocker E is the usual roller 21 which is engaged by the usual universal bar as will be readily understood.

In the normal position of the parts as shown in Figure 1, the upper portion 10 of the dog rocker E is located in a substantially vertical plane containing the axis of the trunnion D. This portion 10 is limited in its forward swinging movement by an adjustable stop screw 22 as shown particularly in Figures 1 and 4, and the dog rocker is yieldably held in this position by means of a coil spring 23 which is connected to the upper portion 10 at a point above the axis of the trunnion, said spring being normally inclined forwardly and downwardly and having its other end connected (not shown) to the frame A at a point in front of the trunnion D.

Assuming that the parts are in their normal positions as shown in Figure 1, the movable dog 13 is being held against the cushion stop 13ᵃ by the tooth of the escapement wheel B, this being due to the usual spring motor or barrel (not shown) which is connected to the rack bar C, and functions to step the carriage one letter space distance each time the escapement mechanism is actuated. When this escapement mechanism is actuated by the universal bar contacting the roller 21, the dog rocker E will be rocked about the trunnion axis against the tension of the spring 23 and the movable dog 13 will immediately leave the tooth of the escapement wheel and the fixed dog 12 will be immediately moved rearwardly into registry with said tooth. As soon as the universal bar withdraws from the roller 21, the spring 23 will return the dog rocker to its normal position with the movable dog 13 engaged by the next adjacent tooth of the escapement wheel which causes said movable dog to bear against the stop 15ª. This movement of the pivoted dog 13 under the influence of the escapement wheel tooth is a very quick movement and causes the movable dog to snap quickly against the stop 15ª thereby creating considerable noise in constructions heretofore employed. By means of my invention, when this impact occurs between the movable dog 13 and the stop 15ª, the blow is cushioned by the spring 20 by reason of said impact or force tending to swing the dog rocker E about its pivot 9 against the tension of said spring 20. Thus the impact between the movable dog 13 and the stop 15ª is cushioned by the spring 20 and consequently the noise of said impact is materially reduced.

In Figure 6, I have illustrated a slightly modified form of trunnion which I have designated by the letter X. This trunnion is provided at one side with an upstanding lug 24 to which the rear end of the spring 23 is adapted to be connected. In the construction illustrated in Figs. 1 to 5, the spring 23 is connected at its rear end to the upper portion 10 of the dog rocker E at a point above the trunnion and inasmuch as the forward end of this spring is connected to the frame A at a point lower than the point of connection of its rear end, the tendency is to swing the rocker E about its pivot 9 and against the tension of the spring 20. It will, therefore, be observed that by connecting the rear end of the spring 23 to the upstanding lug 24 of the trunnion X, all tendency of the spring 23 to exert a rocking force on the dog rocker E will be eliminated.

In Figures 8 and 9, I have illustrated another form for cushioning the impact of the movable dog 13 against the stop 15ª. In this form I have provided a cushion intermediate the dog rocker E and the trunnion Y. To this end the trunnion Y is provided with a forwardly extending integral shelf 25 and rigidly attached to the front face of the upper portion 10 of the dog rocker E is a bracket 26 having a forwardly extending stop 27, and disposed between the shelf 25 and the stop 27 is a pad 28 of cushioning material such as felt or the like. In this form of the invention when the pivoted dog 13 snaps against the stop 15ª the noise of impact will be materially reduced owing to the force of the blow being considerably absorbed by the cushion 28.

I claim:—

1. An escapement mechanism for typewriting or like machines comprising a frame, an escapement wheel journaled thereon, a trunnion pivoted on the frame below the wheel for rocking movements about a plane at right angles to the axis of the escapement wheel, a dog rocker pivoted on the trunnion to rock about an axis disposed in a plane parallel to the axis of the escapement wheel, a fixed dog, a stop, and a pivoted dog mounted on the rocker for cooperation with the escapement wheel to permit the latter to rotate intermittently upon rocking movements of the rocker about the trunnion axis, means for yieldably resisting the downward rocking movement of the rocker about its pivotal connection with the trunnion upon successive impacts of the pivoted dog against the stop under the stepping influence of the escapement wheel teeth, and a pin and slot connection between the trunnion and the rocker for limiting the upward pivotal movement of the rocker.

2. An escapement mechanism for typewriting or like machines comprising a frame, an escapement wheel journaled thereon, a trunnion pivoted on the frame below the wheel for rocking movements about a plane at right angles to the axis of the escapement wheel, a dog rocker pivoted on the trunnion to rock about an axis disposed in a plane parallel to the axis of the escapement wheel, a fixed dog, a stop, and a pivoted dog mounted on the rocker for cooperation with the escapement wheel to permit the latter to rotate intermittently upon rocking movements of the rocker about the trunnion axis, and a coil spring connected at its upper end to the trunnion and at its lower end to the rocker for yieldably resisting the downward rocking movement of the rocker about its pivotal connection with the trunnion upon successive impacts of the pivoted dog against the stop under the stepping influence of the escapement wheel teeth.

3. An escapement mechanism for typewriting or like machines comprising a frame, an escapement wheel journaled thereon, a trunnion pivoted on the frame below the wheel for rocking movements about a plane at right angles to the axis of the escapement wheel, a dog rocker pivoted on the trunnion to rock about an axis disposed in a plane parallel to the axis of the escapement wheel, a fixed dog, a stop, and a pivoted dog mounted on the rocker for cooperation with the escapement wheel to permit the latter to rotate intermittently upon rocking movements of the rocker about the trunnion axis, a coil spring connected at its upper end to the trunnion and at its lower end to the rocker for yieldably resisting the downward rocking movement of the rocker about its pivotal connection with the trunnion upon successive impacts of the pivoted dog against the stop under the stepping influence of the escapement wheel teeth, and cooperating means between the trunnion and the rocker for limiting the upward pivotal movement of the rocker.

4. An escapement mechanism for typewriting or like machines comprising a frame, an escapement wheel journaled thereon, a trunnion pivoted on the frame below the wheel for rocking movements about a plane at right angles to the axis of the escapement wheel, a dog rocker pivoted on the trunnion to rock about an axis disposed in a plane parallel to the axis of the escapement wheel, a fixed dog, a stop, and a pivoted dog mounted on the rocker for cooperation with the escapement wheel to permit the latter to rotate intermittently upon rocking movements of the rocker about the trunnion axis, means for yieldably resisting the downward rocking movement of the rocker about its pivotal connection with the trunnion upon successive impacts of the pivoted dog against the stop under the stepping influence of the escapement wheel teeth, a stop to limit the forward swinging movement of the upper portion of the dog rocker about the trunnion axis, and a coil spring connected at one end to the trunnion at a point above the axis thereof for yieldably retaining the upper portion of the dog rocker against said last-mentioned stop.

GEORGE F. HANDLEY.